United States Patent [19]

Rocco et al.

[11] Patent Number: 4,748,845
[45] Date of Patent: Jun. 7, 1988

[54] TIRE PRESSURE GAUGE

[75] Inventors: Art Rocco, Spokane, Wash.; David R. Ripley, Flower Mound, Tex.

[73] Assignee: Neotech Industries, Inc., Irving, Tex.

[21] Appl. No.: 112,241

[22] Filed: Oct. 21, 1987

Related U.S. Application Data

[63] Continuation of Ser. No. 864,799, May 19, 1986, Pat. No. 4,704,901.

[51] Int. Cl.$^4$ .................. G01L 9/00; G01M 17/02
[52] U.S. Cl. ..................... 73/146.8; 73/709; 73/723; 73/753; 73/756; 340/58
[58] Field of Search ............... 73/146.8, 146.3, 146.5, 73/709; 340/58; 73/754, 756, 717, 718, 719, 720, 721, 722, 723, 724, 725, 726, 727, 728, 733, 734, 735, , 745, 746

[56] References Cited

U.S. PATENT DOCUMENTS

| | | | |
|---|---|---|---|
| 1,755,010 | 4/1930 | Little | 73/146.3 |
| 2,279,140 | 4/1942 | Kellen | 73/146.5 |
| 2,329,039 | 9/1943 | Fenwick | 73/146.8 |
| 2,938,379 | 5/1960 | Reh | 73/146.8 |
| 3,266,304 | 8/1966 | Cohen et al. | 73/146.8 |
| 3,713,092 | 1/1973 | Ivenbaum | 73/146.5 |
| 3,717,030 | 2/1973 | McGhee et al. | 73/146.8 |
| 3,787,806 | 1/1974 | Church | 73/146.3 |
| 3,857,283 | 12/1974 | Jennings et al. | 73/726 |
| 3,992,926 | 11/1976 | Berryhill | 128/652 |
| 4,038,532 | 7/1977 | Burris et al. | 73/755 |
| 4,059,823 | 8/1977 | Martin et al. | 73/146.8 |
| 4,074,227 | 2/1978 | Kalmus | 340/58 |
| 4,130,817 | 12/1978 | Hill et al. | 73/146.5 |
| 4,137,520 | 1/1979 | Deveau | 73/146.5 |
| 4,143,545 | 3/1979 | Sitabkhan | 73/146.8 |
| 4,160,234 | 7/1979 | Karbo et al. | 73/146.5 |
| 4,210,898 | 7/1980 | Betts | 73/146.5 |
| 4,237,728 | 12/1980 | Betts et al. | 73/146.5 |
| 4,250,759 | 2/1981 | Vago et al. | 73/146.8 |
| 4,263,579 | 4/1981 | Corgan et al. | 73/146.5 |
| 4,275,377 | 6/1981 | Matsuda et al. | 73/146.5 |
| 4,352,168 | 9/1982 | Anderson | 73/723 |
| 4,468,650 | 8/1984 | Barbee | 73/146.5 |
| 4,494,106 | 1/1985 | Smith et al. | 73/146.5 |
| 4,562,874 | 1/1986 | Scheller | 73/146.5 |
| 4,704,901 | 11/1987 | Rocco et al. | 73/146.8 |

*Primary Examiner*—Donald O. Woodiel
*Attorney, Agent, or Firm*—Wells, St. John & Roberts

[57] ABSTRACT

A tire pressure gauge located within a self-contained enclosure having a changeable numeric display at its exterior. An air inlet on the enclosure is utilized to establish pneumatic communication between the interior of an inflated tire and the interior of the enclosure. The enclosure interior is provided with electronic pressure responsive circuits operably connected to the display for presenting a numerical reading of air pressure. A power control circuit is operated by a programmed CPU, which electronically shifts it between operative and inoperative states to prolong battery life. The programmed CPU also detects maximum pressure readings, which are announced to the user by an electronically driven audible signal device within the hand-held enclosure.

17 Claims, 2 Drawing Sheets

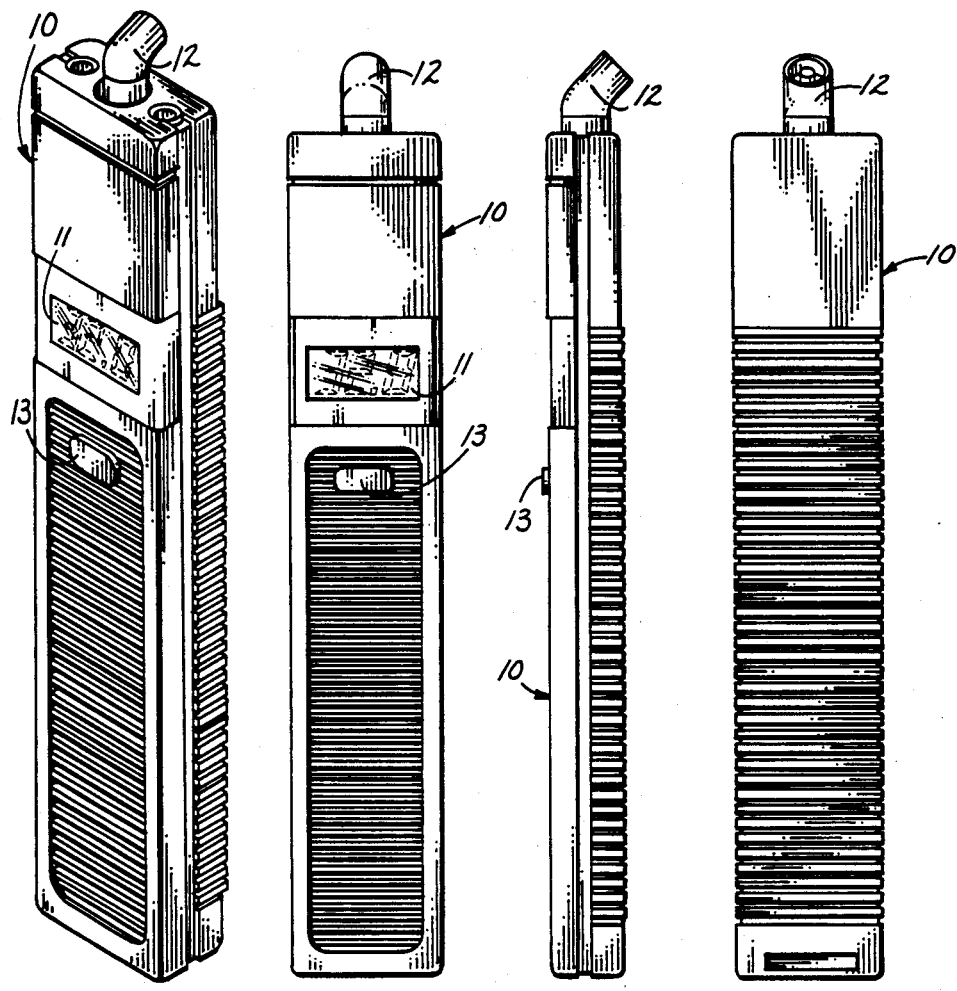
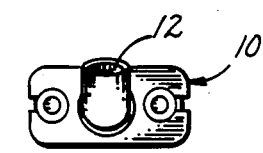

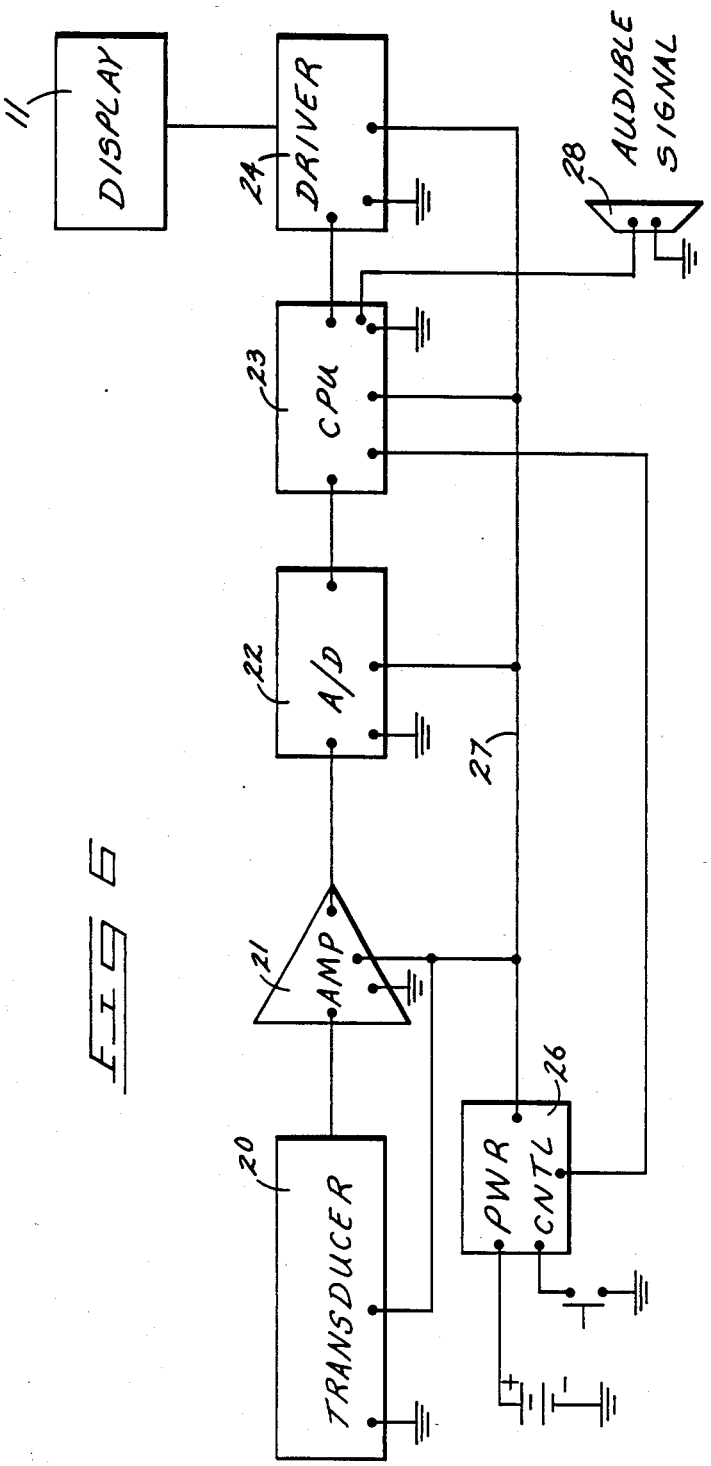

TIRE PRESSURE GAUGE

This is a continuation of application Ser. No. 864,799, filed May 19, 1986, now U.S. Pat. No. 4,704,901.

FIELD OF THE INVENTION

This disclosure relates to electronic hand held gauges for reading inflated tire pressures.

BACKGROUND OF THE INVENTION

Tire pressures have been conventionally read by mechanical gauges attached to compressed air supply hose assemblies or by small hand-held mechanical gauges, which typically utilize a moving scale or a reciprocating plunger as a readable gauge element for presentation of pressure values. Because such gauges rely upon mechanical movement to provide an indication of pressure values, they are susceptible to deterioration and physical damage during their projected use under a variety of environmental conditions. Most such gauges are incapable of accurate air pressure measurement over extended periods of use.

With recent advances in the miniaturization and accuracy of electronic measurement systems, it has become desirable to apply electronic technology to the measurement of tire pressure. The present invention provides accurate and dependable measurement of tire pressure by use of a portable, hand-held electronic unit that is totally self-contained. It can be readily applied to the valve stem of a tire without the need of any special skill.

BRIEF DESCRIPTION OF THE DRAWINGS

The preferred embodiment of the invention is illustrated in the accompanying drawings, in which:

FIG. 1 is a perspective view of the tire pressure gauge;
FIG. 2 is a front elevational view;
FIG. 3 is a side view;
FIG. 4 is a rear view;
FIG. 5 is a top view; and
FIG. 6 is a block diagram of the electronic components incorporated within the gauge.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

The drawings illustrate a preferred form of the invention, which is housed within a protective enclosure 10. The front wall of enclosure 10 includes an electronically operated numerical display 11. Display 11 is operable to present a digital or numerical display indicative of tire pressure. It can comprise a suitable number of conventional seven segment liquid crystal displays (LCD) or light emitting diodes (LED) or any similar electronic numerical displays.

Enclosure 10 also includes an air inlet 12 having a cylindrical outer opening for sealing engagement against the outer end of a valve stem on an inflated tire (not shown) for establishing pneumatic communication between the interior of the tire and the interior of enclosure 10. The air inlet 12 illustrated in the drawings has an angular configuration to offset its outer opening from the longitudinal axis of the enclosure. This angular relationship assists in manually holding the air inlet 12 to the valve stem of a tire. However, many different structural configurations can be presented along the air inlet 12, depending upon the specific application in which the gauge is to be used, the size of the tires with which it is to be used, and other restrictions to access at a valve stem for pressure measuring purposes. It is preferable that the air inlet 12 be interchangeable with other air inlets of differing configurations to match specific needs of a user. This can be accomplished by threaded attachments, bayonet mount or other detachable arrangements.

A momentarily actuated manual switch 13 is provided at the exterior of enclosure 10 to initiate operation of the gauge circuitry for purposes to be described below. Switch 13 can be a manually depressable push button switch, as shown, or can constitute a proximity switch or capacitive switch momentarily operable when touched by a user, and requiring no mechanical depression.

The air pressure gauge is completely self-contained and requires no external power sources for accurate reading of tire pressure. Electronic pressure responsive means (shown as circuit elements 20 through 24) are provided within enclosure 10. They are operably connected to display 11 for producing, when powered, a numerical presentation on the display 11 corresponding to air pressure within the interior of the enclosure while in pneumatic communication with the interior of an inflated tire. The electronic pressure responsive means includes a pressure sensor 20, such as a piezoresistive transducer. Sensor 20 is physically located within enclosure within a sealed chamber in pneumatic communication with the air inlet 12. Thus, the pressure sensor 20 is subjected to the interior air pressure within a tire when air inlet 12 operably is engaged with the valve stem of an inflated tire. The analog output signal of pressure sensor 20 is fed through an amplifier 21 operably connected to an analog-to-digital converter circuit shown at 22. The resulting digital signals corresponding to air pressure are directed to suitable electronic control means, such as a microprocessor circuit (CPU) 23. The CPU 23 controls operation of a driver circuit 24 that in turn operates the visual display 11 to provide a numerical display of air pressure.

Power for the various electronic circuits that comprise the electronic pressure responsive means within enclosure 10 is provided from a battery power source 25 within enclosure 10. Control of power is achieved through a power control circuit 26 that is operated by CPU 23 and an interconnecting power bus 27. All of the described circuit components are conventional and located within the confines of the previously described enclosure 10.

The illustrated circuitry is completed by an audible signal device 28 operably connected to CPU 23.

Because of its portable nature and relatively small size, the circuitry within enclosure 10 has been designed to provide maximum battery life before replacement or recharging of battery 25 is required. This is achieved through proper programmed operation of the power control circuitry 26 and by utilization of the manually operable switch 13. The power control circuit 26 is operably connected between the battery 25, the electronic pressure responsive circuits comprised of circuits 20 through 24, and the display 11. The power control circuit 26 is electronically shiftable between a first state in which operation of the electronic pressure responsive circuits 20 through 24 and display 11 are powered and a second state in which they are inoperative. The manually operable switch 13 at the exterior of enclosure 10 is operably connected to the power control circuit 26 for selectively causing the power control circuit 26 to be shifted to its first state when the switch 13 is momentarily actuated by the user.

To minimize battery operation, the CPU 23 is preferably programmed to cause the power control circuit 26 to be shifted to its second state following a first predetermined time period after actuation of switch 13 by the user, unless pneumatic communication is established between the interior of the enclosure 10 and the interior of an inflated tire prior to expiration of the first predetermined time period. A typical first time period is five seconds. The establishment of pneumatic communication with an inflated tire is detected by pressure sensor 20, which is preferably a piezoresistive transducer that produces an analog signal in response to increased air pressure being applied to it. The digitized signal that is indicative of such pneumatic communication is then detectable by the programmed CPU 23 to maintain power control circuit 26 in an active state for a second time period adequate to assure detection of a peak pressure value while the gauge is in communication with an inflated tire. A typical period for this watchdog timer function is ten seconds. Finally, CPU 23 is programmed to time operation of power control circuit 26 for a third time period, typically five seconds, after the sensed air pressure has returned to a zero value following disconnection of the gauge from a tire valve stem. This provides time for a user to subsequently read the numerical information presented on display 11. The progression of time periods, which normally overlap one another, assures normal gauge operation while minimizing battery usage even under circumstances where internal components of the gauge might be momentarily inoperative or operate improperly.

In order to emulate the action of mechanical gauges to which users of motor vehicles have become accustomed, the electronic pressure responsive circuits 20 through 24 are programmed to cause display 11 to present an ascending sequence of numerical values corresponding to air pressure within the enclosure 10 as pneumatic communication is established between its interior and the interior of an inflated tire within a first predetermined time period following actuation of the switch means. To do this, CPU 23 must be programmed to maintain power control circuit 26 in an operative state while increasing pressure readings are being verified by the changes in the signals produced by pressure sensor 20.

The electronic pressure responsive circuits 20 through 24 are also programmed to detect the maximum air pressure within the interior of enclosure 10 when such changes in the output signal of sensor 20 terminate. When the maximum air pressure reading has been electronically established, CPU 23 is preferably programmed to maintain a visual presentation of the corresponding numerical value for the air pressure at the display 11 for a second predetermined time period following the establishment of pneumatic communication between the interior of the enclosure 10 and the interior of an inflated tire. This time period is also typically five seconds.

The detection of a maximum air pressure reading is preferably announced by actuation of the audible signal device 28, which alerts the user to the fact that the gauge can then be physically detached from the tire valve stem so that it can be easily read at a position convenient to the user. The programmed CPU 23 is then operable to cause the power control circuit 26 to be shifted to its second or disabled state at the conclusion of the second predetermined time period. It is to be noted that when the power control circuit 26 is in its second state, no power is supplied from battery 25 to any of the electronic components within enclosure 10. They are totally inoperative until subsequently activated by switch 13. Thus, there is no power drain on battery 25 other than when the gauge is in use.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A pressure gauge, comprising:
   a self-contained enclosure having a changeable display visible at one exterior surface;
   inlet means mounted to the enclosure for establishing communication between a pressurized substance and the interior of the enclosure;
   electronic pressure responsive means located within the enclosure and operably connected to the display for producing, when powered, a presentation on the display corresponding to the pressure of the substance;
   a power source within the enclosure; and
   control means within the enclosure operably connected between the power source, the electronic pressure responsive means and the display, the control means being shiftable between a first state in which operation of the electronic pressure responsive means and display are powered and a second state in which they are inoperative;
   the electronic pressure responsive means being operable to cause the control means to be shifted to its second state following a first predetermined time period after the control means has been shifted to its first state unless communication is established between the interior of the enclosure and the pressurized substance prior to expiration of the first predetermined time period.

2. The pressure gauge of claim 1 further comprising:
   switch means within the enclosure operably connected to the control means for selectively shifting it to its first state when the switch means is actuated.

3. A pressure gauge, comprising:
   a self-contained enclosure having a changeable display visible at one exterior surface;
   inlet means mounted to the enclosure for establishing communication between a pressurized substance and the interior of the enclosure;
   electronic pressure responsive means located within the enclosure and operably connected to the display for producing, when powered, a presentation on the display corresponding to the pressure of the substance;
   a power source within the enclosure;

control means within the enclosure operably connected between the power source, the electronic pressure responsive means and the display, the control means being shiftable between a first state in which operation of the electronic pressure responsive means and display are powered and a second state in which they are inoperative;

the electronic pressure responsive means being operable to cause the display to present a presentation corresponding to the pressure of the substance within a predetermined time period after communication is established between the interior of the enclosure and the pressurized substance; and the electronic pressure responsive means being operable to cause the control means to be shifted from its first state to its second state at the conclusion of the predetermined time period.

4. The pressure gauge of claim 3 further comprising:
switch means within the enclosure operably connected to the control means for selectively shifting it to its first state when the switch means is actuated.

5. A pressure gauge, comprising:
a self-contained enclosure having a changeable display visible at one exterior surface;
inlet means mounted to the enclosure for establishing communication between a pressurized substance and the interior of the enclosure;
electronic pressure responsive means located within the enclosure and operably connected to the display for producing, when powered, a presentation on the display corresponding to the pressure of the substance;
a power source within the enclosure;
control means within the enclosure operably connected between the power source, the electronic pressure responsive means and the display, the control means being shiftable between a first state in which operation of the electronic pressure responsive means and display are powered and a second state in which they are inoperative;
the electronic pressure responsive means being operable to detect the maximum pressure within the interior of the enclosure and then maintain a visual presentation at the display for a predetermined time period; and
the electronic pressure responsive means being operable to cause the control means to be shifted from its first state to its second state at the conclusion of the predetermined time period.

6. The pressure gauge of claim 5 further comprising:
switch means within the enclosure operably connected to the control means for selectively shifting it to its first state when the switch means is actuated.

7. A pressure gauge, comprising:
a self-contained enclosure having a changeable display visible at one exterior surface;
inlet means mounted to the enclosure for establishing communication between a pressurized substance and the interior of the enclosure;
electronic pressure responsive means located within the enclosure and operably connected to the display for producing, when powered, a presentation on the display corresponding to the pressure of the substance;
a power source within the enclosure;

control means within the enclosure operably connected between the power source, the electronic pressure responsive means and the display, the control means being shiftable between a first state in which operation of the electronic pressure responsive means and display are powered and a second state in which they are inoperative;

the electronic pressure responsive means being operable to detect the maximum pressure within the interior of the enclosure and to maintain a visual presentation at the display for a predetermined time period following such detection;

signal means within the enclosure, the signal means being operably connected to the electronic pressure responsive means; and the electronic pressure responsive means being operable to actuate the signal means when maximum pressure within the interior of the enclosure is detected.

8. The pressure gauge of claim 7 further comprising:
switch means within the enclosure operably connected to the control means for selectively shifting it to its first state when the switch means is actuated.

9. The pressure gauge of claim 7 wherein the signal means comprises an audible signal device.

10. A pressure gauge, comprising:
a self-contained enclosure having a changeable display visible at one exterior surface;
inlet means mounted to the enclosure for establishing communication between a pressurized substance and the interior of the enclosure;
electronic pressure responsive means located within the enclosure and operably connected to the display for producing a presentation on the display corresponding to pressure of the substance;
signal means within the enclosure, the signal means being operably connected to the electronic pressure responsive means;
the electronic pressure responsive means being operable to detect the maximum pressure within the interior of the enclosure and to actuate the signal means when maximum pressure within the interior of the enclosure is detected.

11. The pressure gauge of claim 10 wherein the signal means comprises an audible signal device.

12. A tire pressure gauge, comprising:
a self-contained enclosure having a changeable numerical display visible at one exterior surface;
air inlet means mounted to the enclosure for sealing engagement against the outer end of the valve stem on an inflated tire and wheel assembly for establishing pneumatic communication between the interior of an inflated tire and the interior of the enclosure;
electronic pressure responsive means within the enclosure, the electronic pressure responsive means being operably connected to the display for producing, when powered, a numerical presentation on the display corresponding to air pressure within the interior of the enclosure while in pneumatic communication with the interior of an inflated tire;
a power source within the enclosure; and
control means within the enclosure operably connected between the power source, the electronic pressure responsive means and the display, the control means being electronically shiftable between a first state in which operation of the electronic pressure responsive means and display are powered and a second state in which they are inoperative;

the electronic pressure responsive means being operable to cause the control means to be shifted to its second state following a first predetermined time period after the control means has been shifted to its first state unless pneumatic communication is established between the interior of the enclosure and the interior of an inflated tire prior to expiration of the first predetermined time period.

13. A tire pressure gauge, comprising:

a self-contained enclosure having a changeable numerical display visible at one exterior surface;

air inlet means mounted to the enclosure for sealing engagement against the outer end of the valve stem on an inflated tire and wheel assembly for establishing pneumatic communication between the interior of an inflated tire and the interior of the enclosure;

electronic pressure responsive means within the enclosure, the electronic pressure responsive means being operably connected to the display for producing, when powered, a numerical presentation on the display corresponding to air pressure within the interior of the enclosure while in pneumatic communication with the interior of an inflated tire;

a power source within the enclosure; and control means within the enclosure operably connected between the power source, the electronic pressure responsive means and the display, the control means being electronically shiftable between a first state in which operation of the electronic pressure responsive means and display are powered and a second state in which they are inoperative;

the electronic pressure responsive means being operable to cause the display to present an ascending sequence of numerical values corresponding to air pressure within the enclosure within a predetermined time period after pneumatic communication is established between the interior of the enclosure and the interior of an inflated tire and to cause the control means to be shifted to its second state at the conclusion of the predetermined time period.

14. A tire pressure gauge, comprising:

a self-contained enclosure having a changeable numerical display visible at one exterior surface;

air inlet means mounted to the enclosure for sealing engagement against the outer end of the valve stem on an inflated tire and wheel assembly for establishing pneumatic communication between the interior of an inflated tire and the interior of the enclosure;

electronic pressure responsive means within the enclosure, the electronic pressure responsive means being operably connected to the display for producing, when powered, a numerical presentation on the display corresponding to air pressure within the interior of the enclosure while in pneumatic communication with the interior of an inflated tire;

a power source within the enclosure; and control means within the enclosure operably connected between the power source, the electronic pressure responsive means and the display, the control means being electronically shiftable between a first state in which operation of the electronic pressure responsive means and display are powered and a second state in which they are inoperative;

the electronic pressure responsive means being operable to detect the maximum air pressure within the interior of the enclosure and then maintain a visual presentation of the corresponding numerical value at the display for a predetermined time period and to cause the control means to be shifted to its second state at the conclusion of the predetermined time period.

15. A tire pressure gauge, comprising:

a self-contained enclosure having a changeable numerical display visible at one exterior surface;

air inlet means mounted to the enclosure for sealing engagement against the outer end of the valve stem on an inflated tire and wheel assembly for establishing pneumatic communication between the interior of an inflated tire and the interior of the enclosure;

electronic pressure responsive means within the enclosure, the electronic pressure responsive means being operably connected to the display for producing, when powered, a numerical presentation on the display corresponding to air pressure within the interior of the enclosure while in pneumatic communication with the interior of an inflated tire;

a power source within the enclosure;

control means within the enclosure operably connected between the power source, the electronic pressure responsive means and the display, the control means being electronically shiftable between a first state in which operation of the electronic pressure responsive means and display are powered and a second state in which they are inoperative;

the electronic pressure responsive means being operable to detect the maximum air pressure within the interior of the enclosure and to maintain a visual presentation of the corresponding numerical value at the display for a predetermined time period following such detection;

signal means within the enclosure, the signal means being operably connected to the electronic pressure responsive means; and the electronic pressure responsive means being operable to actuate the signal means when maximum air pressure within the interior of the enclosure is detected.

16. A tire pressure gauge, comprising:

a self-contained enclosure having a changeable display visible at one exterior surface;

air inlet means mounted to the enclosure for sealing engagement against the outer end of the valve stem of an inflated tire and wheel assembly for establishing pneumatic communication between the interior of an inflated tire and the interior of the enclosure;

electronic pressure responsive means within the enclosure, the electronic pressure responsive means being operably connected to the display for producing a presentation on the display corresponding to air pressure within the interior of the enclosure while in pneumatic communication with the interior of an inflated tire;

signal means within the enclosure, the signal means being operably connected to the electronic pressure responsive means; and the electronic pressure responsive means being operable to detect the maximum air pressure within the interior of the enclosure and to actuate the signal means when maximum air pressure within the interior of the enclosure is detected.

17. The tire pressure gauge of claim 16 wherein the signal means comprises an audible signal device.

* * * * *

Disclaimer 4,748,845.—*Art Rocco*, Spokane, Wash.; *David R. Ripley*, Flower Mound, Tex. TIRE PRESSURE GAUGE. Patent dated June 7, 1988. Disclaimer filed Mar. 20, 1989, by the assignee, Neotech Industries, Inc.

The term of this patent subsequent to Nov. 10, 2004, has been disclaimed.

[ *Official Gazette June 27, 1989* ]